UNITED STATES PATENT OFFICE.

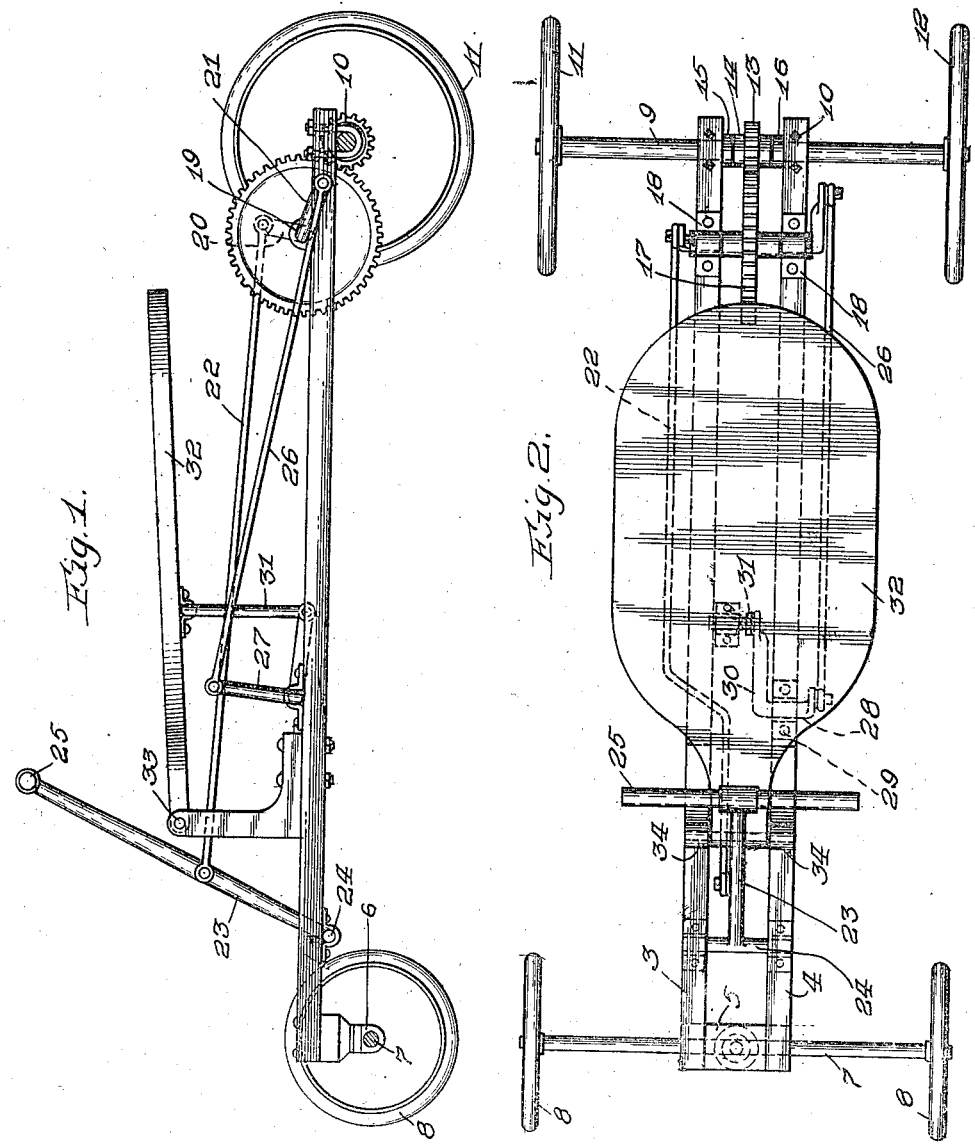

ARTHUR B. McCORD, OF OAK PARK, ILLINOIS, ASSIGNOR, BY MESNE ASSIGNMENTS, TO KANGAROO MANUFACTURING CO., A CORPORATION OF ILLINOIS.

TOY CAR.

1,181,234.  Specification of Letters Patent.  Patented May 2, 1916.

Application filed May 27, 1915. Serial No. 30,735.

*To all whom it may concern:*

Be it known that I, ARTHUR B. McCORD, a citizen of the United States, residing at Oak Park, Cook county, Illinois, have invented certain new and useful Improvements in Toy Cars, of which the following is a specification.

My invention relates to that form of car having simple means by which the rider can propel the same without the use of the feet, using the latter for steering.

The precise nature of the invention may be gathered from the following description taken in connection with the claims appended thereto. It is to be understood that the specific disclosure is for the purpose of exemplification only and that the scope of the invention is to be determined from the claims in which I have endeavored to distinguish the same from the prior art so far as known to me without, however, relinquishing or abandoning any portion or feature thereof.

In the accompanying drawings Figure 1 is a side elevation of the device partly in section to better reveal the construction and Fig. 2 is a plan.

The construction comprises a suitable frame which may be of any ordinary or approved character but in this instance is shown as consisting of a pair of longitudinal members 3, 4 which are connected together at their front ends by a cross head 5 to which latter is swiveled a turning block 6 carrying the beam or axle 7 upon which the front wheels 8 are mounted. The axle 9 carrying the rear wheels is journaled to the rear ends of the members 3, 4 as for example by the yoke members 10, 10 projecting downwardly from said members. One of the wheels 11 is rigidly secured to said axle but the other wheel 12 is revoluble thereon. The rigidily secured wheel is the driving wheel. The axle 9 midway the members 3, 4 carries a spur gear 13 which is rigidly mounted on said axle and spaced from said longitudinal members by its hub 14 and the collars 15, 16. A driving gear wheel 17 meshes with the spur or driven gear 13 and is journaled in bearing brackets 18, 18 secured to the respective longitudinal members a proper distance in front of the rear axle. The hub of the driving gear 17 is of sufficient length to bear against the brackets 18 and so maintain the gear wheel in alinement with the spur gear 13. The driving gear 17 is rigidly secured to an axle 19 which is journaled in said brackets 18 and formed with a pair of crank arms 20, 21 which are preferably formed at a little more than right angles with each other. One of these arms 20 is connected by a link or rod 22 with a handle or lever 23, the lower end of which is suitably pivoted as at 24 to the frame of the wagon and the upper end provided with a cross handle 25 which may be used by the operator in swinging the lever forward and back to drive through the link 22 and arm 20, the driving gear wheel 17 and the spur gear 13 on the rear axle. The other arm 21 on the shaft 19 is connected by a link 26 with a crank arm 27 on a cross shaft 28. Said cross shaft is journaled in a bracket 29 upon the longitudinal member 4 and at its other end is formed with an arm 30 substantially at right angles to the arm 27 and connected by a link 31 to the bottom of the pivoted seat 32. Said seat is pivoted at its forward end as at 33 to a pair of brackets 34, 34 rising from the respective longitudinal members.

The operation of the car will now be obvious. The child using the same takes its position upon the seat and grasps the handle, placing its feet upon the front axle so as to maintain the latter in proper position or to swing it about its vertical axis to control the course of the device. The car is driven by a combination of the vertical swinging movement of the seat with the backward and forward movement of the lever. Because of the relations of the arms 20, 21 the hand lever and seat act to drive the cart during different phases of the rotation of the gear 17 whereby stopping of the mechanism on a dead center is avoided.

It will be clear from an inspection of Fig. 1 that the act of pulling the lever 23 rearwardly tends to raise the body of the operator and to relieve the seat of his weight so that the seat rises with the operator. As the lever approaches its rearmost position the seat is approximately in its uppermost position so that the operator may then deposit his weight upon the seat and drive the car throughout the succeeding half revolution of the driving gear wheel 17 thereby, so bringing the lever 23 into its forward position in which it is ready for its next backward movement. The propulsion of the car is thus effected by the alternate rearward pulling upon the lever 23 accompanied by a rising of the seat, and downward movement of the seat under the weight of the operator, thus giving an up-and-down movement to the body as well as a forward-and-back movement to the arms. The variety of movement is not only exhilarating but tends to uniformly develop the main muscles of the body.

I claim:

1. In a machine of the class described, a frame, a shaft journaled in the frame and having ground wheels mounted thereon, a driven gear fixed to the shaft, a suitably mounted driving gear wheel having two cranks substantially at right angles to each other, said driving gear being in mesh with the driven gear, a pivoted seat positioned for vertical swinging movement, a pivoted hand lever for backward and forward movement, a link between the hand lever and one of said cranks and means substantially as set forth to connect the seat with the other of said cranks.

2. In a machine of the class described, a frame, a shaft journaled in the frame and having ground wheels mounted thereon, a driven gear rigidly mounted on the shaft, a crank shaft journaled on the frame, a driving gear wheel fixed to the crank shaft, a cross shaft, an arm on said cross shaft, a link connecting said arm and crank, a second arm on said cross shaft, a seat pivoted at its forward end on the carriage and a link connecting said seat and last named arm.

3. In a machine of the class described, a frame, a shaft journaled in the frame and having ground wheels mounted thereon, a driven gear fixed to the shaft, a driving gear wheel having two cranks substantially at right angles to each other, the driving gear being in mesh with the driven gear, a pivoted seat positioned for vertical swinging movement, a cross shaft, an arm on said cross shaft, a link connecting said arm and one of said cranks, a second arm on said cross shaft and a link connecting said seat and last named arm, a pivoted hand lever for backward and forward movement and a link from the hand lever to the other of said cranks.

4. In a machine of the class described, a frame, a bracket secured to the frame, a shaft journaled in the frame and having ground wheels mounted thereon, a gear on said shaft, a second gear, a shaft upon which said second gear is mounted, crank arms on said last named shaft arranged approximately perpendicular to each other, a pivoted lever, a link connecting said lever to one of said crank arms, a cross shaft, a link connecting said cross shaft with the other of said crank arms, an arm connected to said cross shaft, a seat pivoted at its forward end to said bracket, and a link connecting the arm on said cross shaft and seat.

5. In a device of the class described, a frame, a bracket secured to the frame, a shaft journaled in the frame and having ground wheels mounted thereon, a driven gear fixed to the shaft, a suitably mounted driving gear wheel having two cranks substantially at right angles to each other, said driving gear being in mesh with the driven gear, a pivoted seat positioned for vertical swinging movement, a pivoted lever for backward and forward movement, a link between the pivoted lever and one of said cranks, and means substantially as set forth to connect the seat with the other of said cranks.

ARTHUR B. McCORD.

Witnesses:
JOHN B. MACAULEY,
ROBERT DOBBERMAN.

Copies of this patent may be obtained for five cents each, by addressing the "Commissioner of Patents, Washington, D. C."